G. R. HOHMAN.
FAUCET.
APPLICATION FILED AUG. 18, 1909.
967,772.
Patented Aug. 16, 1910.
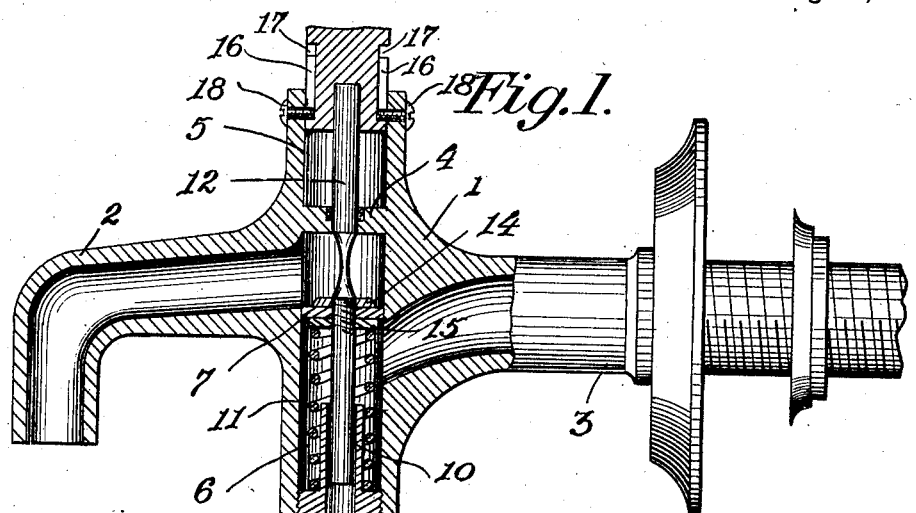
Fig.1.
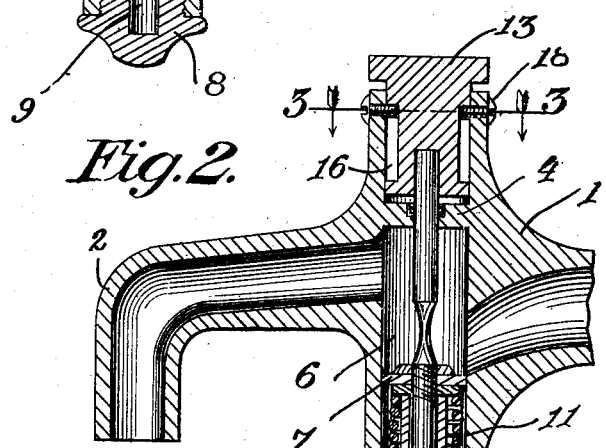
Fig.2.
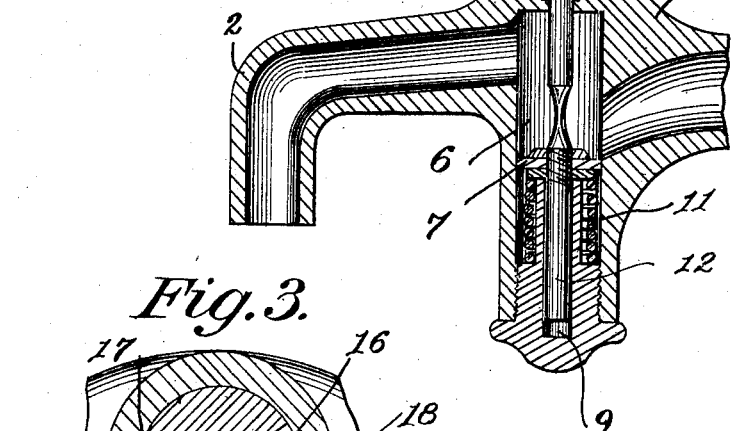
Fig.3.
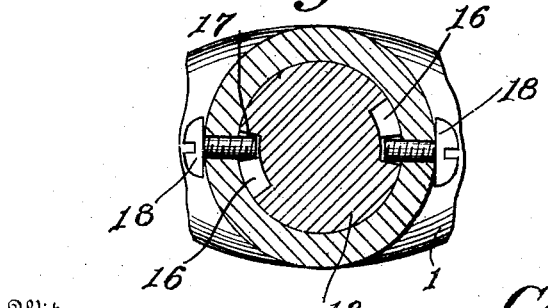
Witnesses
Horace H. Lybrand
V. B. Hillyard
Inventor
George R. Hohman
By Victor J. Evans
Attorney
THE NORRIS PETERS CO., WASHINGTON, D. C.

UNITED STATES PATENT OFFICE.

GEORGE R. HOHMAN, OF ROCHESTER, NEW YORK.

FAUCET.

967,772.

Specification of Letters Patent. Patented Aug. 16, 1910.

Application filed August 18, 1909. Serial No. 513,490.

*To all whom it may concern:*

Be it known that I, GEORGE R. HOHMAN, a citizen of the United States, residing at Rochester, in the county of Monroe and State of New York, have invented new and useful Improvements in Faucets, of which the following is a specification.

The invention appertains to faucets or like fixtures for controlling the outflow of liquid or fluid from any vessel, container, or system of piping, and has for its object to supply a faucet designed most especially for malt and kindred beverages and automatic in operation to shut off the flow and prevent waste.

The invention resides especially in the particular construction of the faucet body, the piston and the piston controlling means, whereby the faucet may be held open and instantly released from the restraining means holding the piston in open position, whereby the piston automatically moves to closed position so as to shut off the outflow.

The invention consists of the novel features, details of construction and combination of parts, which hereinafter will be more particularly set forth, illustrated in the accompanying drawing, and pointed out in the appended claims.

Referring to the drawing, forming a part of the specification, Figure 1 is a vertical central longitudinal section of a faucet embodying the invention, the shank portion of the body and the connecting means being in full. Fig. 2 is a sectional detail of the nozzle and body portions of the faucet, showing the position of the parts when the piston is moved to open position and secured. Fig. 3 is a horizontal section on the line 3—3 of Fig. 2, looking in the direction of the arrows.

Corresponding and like parts are referred to in the following description, and indicated in all the views of the drawing, by the same reference characters.

The body of the faucet is indicated at 1 and is provided with a nozzle 2 and shank 3, the latter being threaded and adapted to receive suitable connecting means for attaching the faucet to the part intended. The body 1 is elongated and arranged at a right angle to the nozzle and shank and is hollow, the opening extending through opposite ends. A partition 4 subdivides the opening or bore of the body into upper and lower chambers 5 and 6. The nozzle 2 communicates with the upper portion of the chamber 6 adjacent the partition 4 and the shank 3 communicates with the chamber 6 a short distance from the partition 4, so that when the faucet is closed the piston 7 occupies a position between the points of communication of the nozzle and shank with the body, as indicated most clearly in Fig. 1. The lower end of the chamber 6 is closed by means of a plug 8, which is threaded thereto and is formed with a central opening 9. A reduced portion 10 projects from the plug 8 and forms a guide both for a spring 11 and a stem 12.

A pressure-piece 13 is fitted to the upper end of the body and is adapted to slide within the chamber 5 and fits the latter snugly. The stem 12 is secured to the pressure-piece 13 and moves therethrough and operates in an opening formed centrally in the partition 4, the opening in said partition being provided with suitable packing to insure the formation of a tight joint between the partition and stem. The piston 7 is secured to the stem 12 and moves therewith and is confined between nuts 14 and 15 threaded upon the stem 12. The piston 7 may be of any material and of such construction as to fit the chamber 6 sufficiently close to prevent the passage of any fluid or liquid between the piston and the walls of the chamber 6. The spring 11 is of helical form and expansible and normally exerts a pressure to force the piston 7 upward. The piston is limited in its upward movement by stops coöperating with the pressure-piece 13. The pressure-piece 13 has a head, the outer edge of which is knurled or otherwise roughened to enable a firm grip being obtained thereon when it is desired to turn the pressure-piece either to lock or to effect release thereof from the stops. Vertical or longitudinal grooves 16 are formed in opposite sides of the pressure-piece and terminate a short distance from the lower end thereof and communicate at their upper ends with lateral notches 17, which extend in opposite directions. Stops 18 coöperate with the grooves 16 to direct the pressure-piece in its reciprocating movements and with the lateral notches 17 to hold the pressure-piece when moved downward to open the faucet so that fluid may discharge therethrough. The stops 18 consist of screws or pins let into the openings formed in the sides of the body 1. The inner ends of the screws or pins project into the grooves 16. When the pressure-piece 13 is depressed or moved downward the inner ends of the screws 18 register with the lateral notches 17 and by giving the pressure piece a slight turn the inner projecting ends of the screws or stops enter the notches 17 and hold the pressure-piece in lowered position, as indicated in Fig. 2, thereby maintaining the faucet in open position so that the fluid may flow freely therethrough without the necessity of any one holding the pressure-piece in lowered position. The faucet may be adapted for any purpose for controlling the outflow of liquid or fluid and when the pressure piece is moved upward and held elevated by the spring 11 the piston 7 is in closed position, as indicated in Fig. 1, thereby preventing discharge of any fluid through the faucet. When the pressure-piece 13 is depressed to move the piston 7 below the point of communication of the shank 3 with the body, fluid flows through said shank into the chamber 6, thence out through the nozzle 2. When the pressure piece is moved downward to the limit of its movement and given a slight turn the stops 18 enter the lateral notches 17 and hold the faucet open, as herein stated. The stops 18 prevent outward displacement of the pressure-piece and at the same time limit upward movement of the piston, the parts being so arranged that when the pressure-piece is at its highest point the piston 7 is in closed position. When the pressure-piece is depressed to the limit of its throw the piston 7 clears the opening through the shank 3, as indicated in Fig. 2, thereby permitting the faucet to discharge to its fullest capacity.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In a faucet comprising a hollow body having a nozzle and a shank in communication with the space thereof at different points, and having a partition dividing the space into upper and lower chambers, a plug closing the lower chamber and having a tubular guide at its upper end, a pressure-piece arranged to operate in the upper chamber, means for holding the pressure-piece when depressed, a stem connected with the pressure-piece and arranged to operate through the said partition and within the guide of the plug, a piston connected with the stem for closing the passage through the faucet, and a spring located in the lower chamber and normally exerting an upward pressure upon the piston to hold the same in closed position.

2. A faucet comprising a hollow body having a nozzle and a shank in communication therewith at different points, and having a partition dividing the space of the body into upper and lower chambers, a plug for closing the lower chamber having a tubular guide at its upper end, a stem arranged to operate through the partition and in said tubular guide, a piston mounted upon the stem to move therewith, a spring located in the lower chamber and normally exerting an upward pressure upon the piston to hold the same in closed position, a pressure-piece connected with the stem and arranged to operate in the upper chamber of the faucet body and provided in opposite sides with longitudinal grooves and with lateral notches in communication with the upper ends of the grooves, and stops projected inward from the body and entering the grooves of the pressure-piece and adapted to pass into the lateral notches thereof to hold the piston in open position.

In testimony whereof I affix my signature in presence of two witnesses.

GEORGE R. HOHMAN.

Witnesses:
ED. L. LATIMER,
GEORGE VOGT.